United States Patent
Krishnan et al.

(10) Patent No.: US 12,344,200 B2
(45) Date of Patent: Jul. 1, 2025

(54) VEHICLE ASSEMBLY FOR SENSOR CLEANING

(71) Applicant: Ford Global Technologies, LLC, Dearborn, MI (US)

(72) Inventors: Venkatesh Krishnan, Canton, MI (US); Rashaun Phinisee, Ypsilanti, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 18/067,781

(22) Filed: Dec. 19, 2022

(65) Prior Publication Data

US 2024/0198973 A1   Jun. 20, 2024

(51) Int. Cl.
| B60S 1/52 | (2006.01) |
| B60S 1/56 | (2006.01) |
| F16K 27/00 | (2006.01) |
| G01S 7/497 | (2006.01) |

(52) U.S. Cl.
CPC . *B60S 1/52* (2013.01); *B60S 1/56* (2013.01); *F16K 27/003* (2013.01); *G01S 2007/4977* (2013.01)

(58) Field of Classification Search
CPC .... B60S 1/48; B60S 1/481; B60S 1/56; F16K 27/003
See application file for complete search history.

(56) References Cited

U.S. PATENT DOCUMENTS

| 10,272,886 | B2 | 4/2019 | Baldovino et al. |
| 2019/0061702 | A1* | 2/2019 | Gopalan ............... B05B 1/08 |
| 2020/0369245 | A1 | 11/2020 | Baldovino et al. |
| 2021/0211561 | A1* | 7/2021 | Okabe ................ B60S 1/56 |
| 2021/0268995 | A1* | 9/2021 | Krishnan ............. F16K 27/003 |

FOREIGN PATENT DOCUMENTS

| CN | 106660525 A | * | 5/2017 | ............ B60R 11/04 |
| WO | WO-2007046106 A2 | * | 4/2007 | ............ B60S 1/488 |
| WO | 2020210450 A1 | | 10/2020 | |
| WO | WO-2020221584 A1 | * | 11/2020 | ........... F16K 27/003 |

OTHER PUBLICATIONS

WO2020221584A1 Machine Translation (Year: 2020).*

* cited by examiner

*Primary Examiner* — Spencer E. Bell
(74) *Attorney, Agent, or Firm* — Frank A. MacKenzie; Brooks Kushman P.C.

(57) ABSTRACT

A vehicle assembly includes a housing, a manifold, a plurality of valves, and a cover. The housing includes a panel, and the panel includes a channel integral to the panel. The manifold is disposed in the channel, and the manifold includes a plurality of outlets. The valves are attached to the manifold, and the valves selectively control flow to the outlets. The cover extends over the manifold, the cover is fixed to the panel, and the cover holds the valves in place.

20 Claims, 4 Drawing Sheets

VEHICLE ASSEMBLY FOR SENSOR CLEANING

BACKGROUND

Autonomous and semi-autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
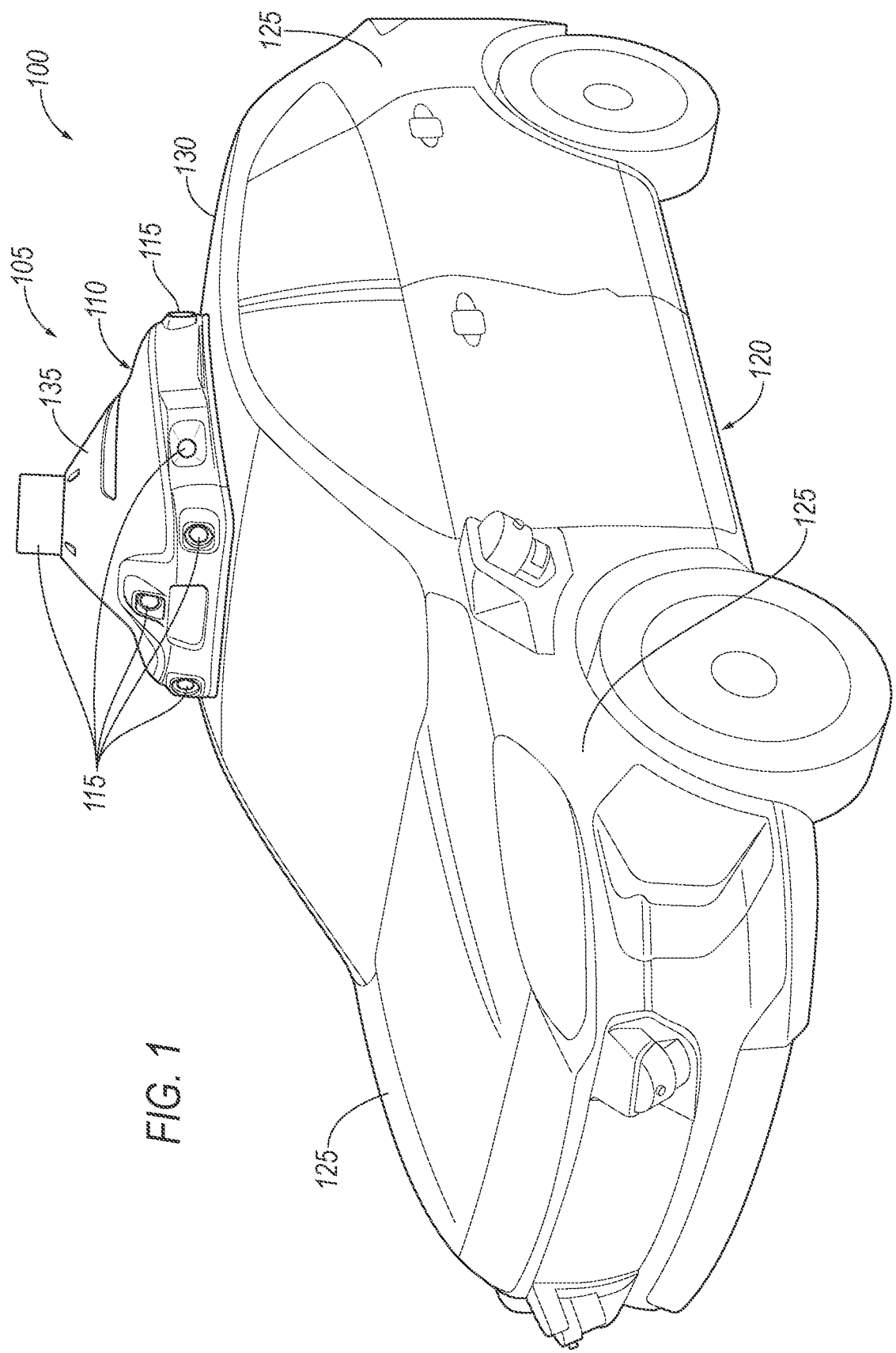
FIG. 1 is a perspective view of an example vehicle with a vehicle assembly.

A vehicle assembly includes a housing, a manifold, a plurality of valves, and a cover. The housing includes a panel, and the panel includes a channel integral to the panel. The manifold is disposed in the channel, and the manifold includes a plurality of outlets. The valves are attached to the manifold, and the valves selectively control flow to the outlets. The cover extends over the manifold, the cover is fixed to the panel, and the cover holds the valves in place.

In an example, the vehicle assembly further may include a sensor disposed in the housing. In a further example, the housing may include a housing lower structure, the housing lower structure may include the panel, and the housing lower structure may support the sensor. In a yet further example, the housing lower structure may be integral.

In another yet further example, the housing may include a housing upper structure fixed to the housing lower structure, the housing upper structure and the housing lower structure may define a chamber therebetween, the sensor may be disposed in the chamber, and the manifold may be disposed in the chamber.

In another further example, the vehicle assembly may further include a nozzle aimed at the sensor, and the nozzle may be fluidly connected to one of the outlets.

In an example, the panel may include two end walls integral to the panel, and the channel may extend from one of the end walls to the other of the end walls. In a further example, the channel and the end walls may define a closed loop. In a yet further example, the channel and the end walls may define a rectangular protrusion from the panel.

In an example, the valves may be individually removable from the channel.

In an example, the vehicle assembly may lack fasteners directly attaching the valves to the panel.

In an example, the manifold may include a single inlet, and the valves may selectively control flow from the inlet to the respective outlets. In a further example, the vehicle assembly may further include a pump arranged to supply fluid to the inlet.

In an example, the cover may be fixed to the panel at an attachment point outside the channel.

In an example, the cover may be fixed to the panel at a maximum of two attachment points. In a further example, the maximum of two attachment points may include two attachment points, and the two attachment points may be located outside the channel. In a yet further example, the attachment points may be located beyond respective opposite ends of the channel.

In an example, the valves may be arranged in a single row along a length of the channel.

In an example, the channel may be straight, and the outlets may extend perpendicular to a direction defined by the channel.

In an example, the valves may be solenoid valves.

With reference to the Figures, wherein like numerals indicate like parts throughout the several views, a vehicle assembly 105 of a vehicle 100 includes a housing 110, a manifold 305, a plurality of valves 310, and a cover 505. The housing 110 includes a panel 205, and the panel 205 includes a channel 405 integral to the panel 205. The manifold 305 is disposed in the channel 405, and the manifold 305 includes a plurality of outlets 315. The valves 310 are attached to the manifold 305, and the valves 310 selectively control flow to the outlets 315. The cover 505 extends over the manifold 305, the cover 505 is fixed to the panel 205, and the cover 505 holds the valves 310 in place.

The manifold 305 and valves 310 may be used for selectively distributing fluid to different nozzles 320 for cleaning sensors 115, as described below. The vehicle assembly 105 provides for ease of inspection and servicing by a technician. Because the cover 505 holds the valves 310 in place, the cover 505 can be removed to access the valves 310, and the valves 310 can then be independently removed and replaced. Moreover, the vehicle assembly 105 uses a small number of parts and has a small dimensional stack-up. The manifold 305 and the valves 310 are contained by the channel 405 between the panel 205 and the cover 505, rather than a separate component containing the manifold 305 and valves 310 and being attached to the panel 205.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 120. The vehicle 100 may be of a unibody construction, in which a frame and the body 120 of the vehicle 100 are a single component. The vehicle 100 may, alternatively, be of a body-on-frame construction, in which the frame supports the body 120 that is a separate component from the frame. The frame and body 120 may be formed of any suitable material, for example, steel, aluminum, etc.

The body 120 includes body panels 125 partially defining an exterior of the vehicle 100. The body panels 125 may present a class-A surface, e.g., a finished surface exposed to view by a customer and free of unaesthetic blemishes and defects. The body panels 125 include, e.g., a roof 130, etc.

The vehicle assembly 105 includes the housing 110 for the sensors 115. The housing 110 is attachable to the vehicle 100, e.g., to one of the body panels 125 of the vehicle 100, e.g., the roof 130. For example, the housing 110 may be shaped to be attachable to the roof 130, e.g., may have a shape matching a contour of the roof 130. The housing 110 may be attached to the roof 130, which can provide the sensors 115 with an unobstructed field of view of an area around the vehicle 100. The housing 110 may be formed of, e.g., plastic or metal.

The vehicle assembly 105 includes the sensors 115. The sensors 115 may detect the location and/or orientation of the vehicle 100. For example, the sensors 115 may include global sensors; positioning system (GPS) accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the vehicle 100, such as other vehicles, road lane markings, traffic lights and/or signs, pedestrians, etc. For example, the sensors 115 may include radar sensors, ultrasonic sensors, scanning laser range finders, light detection and ranging (lidar) devices, and image processing sensors such as cameras.

Figure 2:
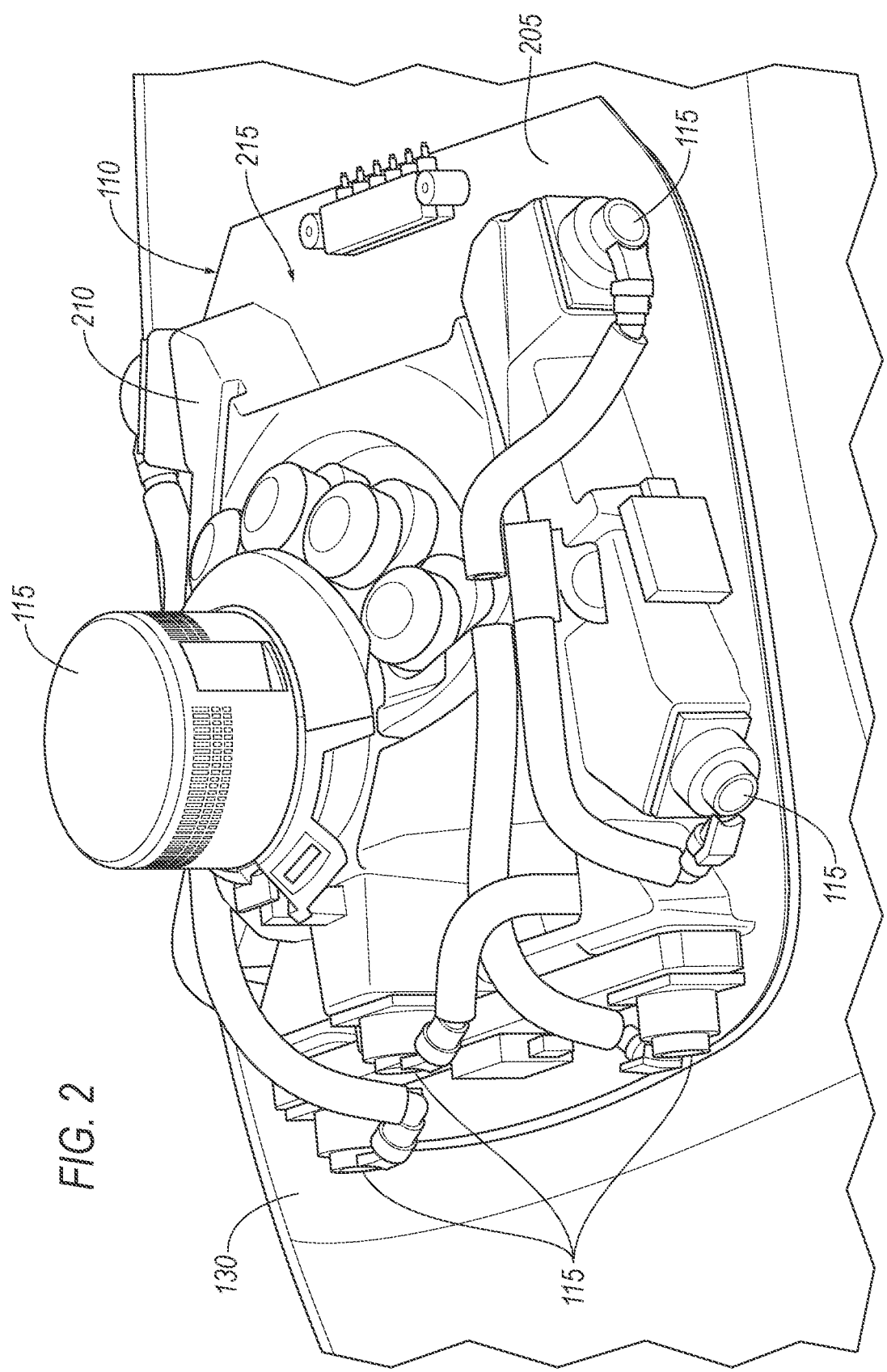
FIG. 2 is a perspective view of the vehicle assembly with a housing upper structure removed for illustration.

With reference to FIGS. 1 and 2, the housing 110 includes a housing upper structure 135 (shown in FIG. 1) and a housing lower structure 210 (shown in FIG. 2). The housing upper structure 135 and the housing lower structure 210 are shaped to fit together, with the housing upper structure 135 fitting on top of the housing lower structure 210. The housing upper structure 135 covers the housing lower structure 210. The housing upper structure 135 is fixed to the housing lower structure 210. The housing upper structure 135 includes a central opening that exposes the housing lower structure 210. The central opening is round, e.g., has a circular or slightly elliptical shape, sized for one of the sensors 115, e.g., a lidar sensor, to fit through. The housing lower structure 210 may be integral, i.e., made of a single, uniform piece of material with no seams, joints, fasteners, or adhesives holding it together.

The housing 110 may enclose and define a chamber 215; e.g., the housing upper structure 135 and the housing lower structure 210 may enclose and define the chamber 215 therebetween. The housing 110, e.g., the housing upper structure 135 and the housing lower structure 210, may fully enclose the chamber 215. The housing 110, e.g., the housing upper structure 135, may shield contents of the chamber 215 from external elements such as wind, rain, debris, etc.

With reference to FIG. 2, at least some of the sensors 115 may be disposed in the housing 110, e.g., in the chamber 215 of the housing 110. The sensors 115 may be mounted to the housing lower structure 210, and the housing lower structure 210 may support the sensors 115. For example, the sensors 115 may include multiple cameras supported by the housing lower structure 210 and disposed in the chamber 215 and at least one lidar device supported by the housing lower structure 210 and extending through the central opening of the housing upper structure 135.

Figure 3:
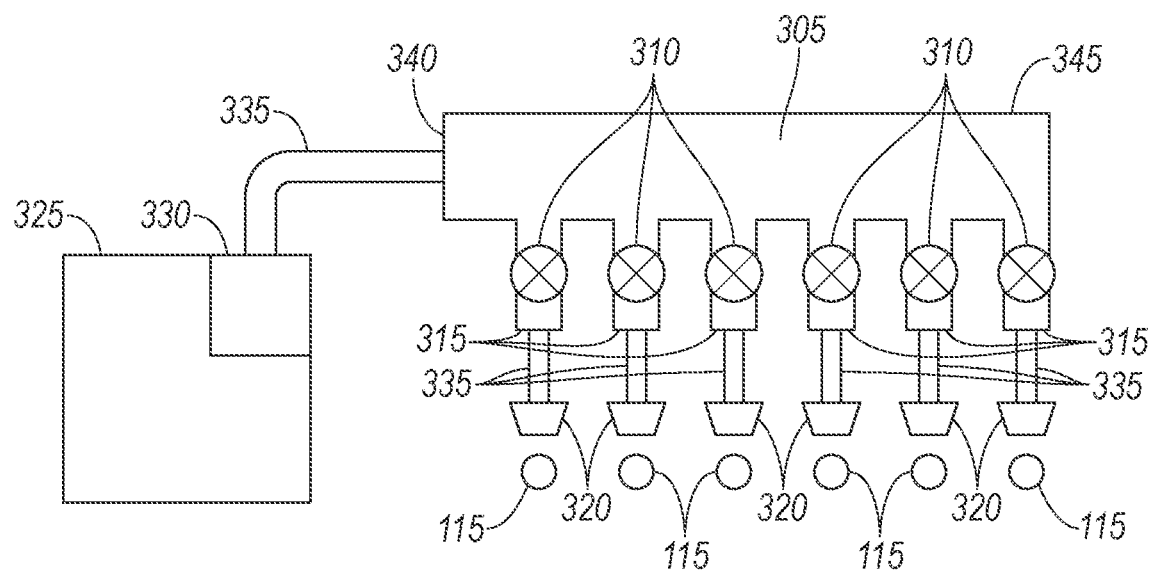
FIG. 3 is a diagram of a cleaning system of the vehicle assembly.

With reference to FIG. 3, the vehicle assembly 105 includes a reservoir 325, a pump 330, supply lines 335, the manifold 305, the valves 310, and the nozzles 320. The reservoir 325, the pump 330, and the nozzles 320 are fluidly connected to each other (i.e., fluid can flow from one to the other) via the supply lines 335 and the manifold 305. The vehicle assembly 105 distributes washer fluid stored in the reservoir 325 to the nozzles 320. "Washer fluid" is any liquid stored in the reservoir 325 for cleaning. The washer fluid may include solvents, detergents, diluents such as water, etc.

The reservoir 325 is a tank fillable with liquid, e.g., washer fluid for window cleaning. The reservoir 325 may be disposed in a front of the vehicle 100, specifically, in an engine compartment forward of a passenger cabin. The reservoir 325 may store the washer fluid only for supplying the sensors 115 or also for other purposes, such as supply to a windshield. Alternatively, the reservoir 325 may be disposed in the chamber 215 of the housing 110.

The pump 330 can force the washer fluid through the supply lines 335 and the manifold 305 to the nozzles 320 with sufficient pressure that the washer fluid sprays from the nozzles 320. The pump 330 is fluidly connected to the reservoir 325. The pump 330 may be attached to or disposed in the reservoir 325. The pump 330 is arranged to supply fluid to an inlet 340 of the manifold 305. The pump 330 may be fluidly connected to the inlet 340 of the manifold 305 via one of the supply lines 335.

The supply lines 335 extend from the pump 330 to the manifold 305 (i.e., to the inlet 340 of the manifold 305) and from the manifold 305 (i.e., the respective outlets 315 of the manifold 305) to the respective nozzles 320. The supply lines 335 may be, e.g., flexible tubes.

The manifold 305 includes the inlet 340, which receives washer fluid from the pump 330 via the supply lines 335, and the outlets 315, which can vary in number. In the example shown in the Figures, the manifold 305 includes six outlets 315. The manifold 305 is shaped to permit fluid entering the inlet 340 to flow through the respective valves 310 to the respective outlets 315. The manifold 305 can direct the fluid entering the inlet 340 to any combination of the outlets 315, dependent on which of the valves 310 are open or closed. The manifold 305 may be disposed in the chamber 215 of the housing 110 and fixed relative to the housing 110, as described below.

The valves 310 selectively control flow to the outlets 315, e.g., from the inlet 340 to the respective outlets 315. Each valve 310 may be positioned and operable to control fluid flow from the pump 330 to one or a subset of the nozzles 320. Specifically, fluid entering the inlet 340 of the manifold 305 must flow through one of the valves 310 to reach the respective outlet 315, which is connected by a respective supply line 335 providing the fluid to the respective nozzle 320. The valves 310 control flow by being actuatable between an open position permitting flow and a closed position blocking flow from the inlet 340 to the respective outlets 315. The valves 310 can be solenoid valves. As a solenoid valve, each valve 310 includes a solenoid and a plunger. Electrical current through the solenoid generates a magnetic field, and the plunger moves in response to changes in the magnetic field. The solenoid moves the plunger between a position in which the valve 310 is open and a position in which the valve 310 is closed.

Each of the nozzles 320 is fluidly connected to one of the outlets 315 via one of the supply lines 335. The nozzles 320 are positioned to eject the washer fluid to clear obstructions from the fields of view of the sensors 115, e.g., aimed at the sensors 115 or at windows (not labeled) for the sensors 115. The pressure of the washer fluid exiting the nozzles 320 can dislodge or wash away obstructions that may impede the fields of view of the sensors 115.

Figure 4:
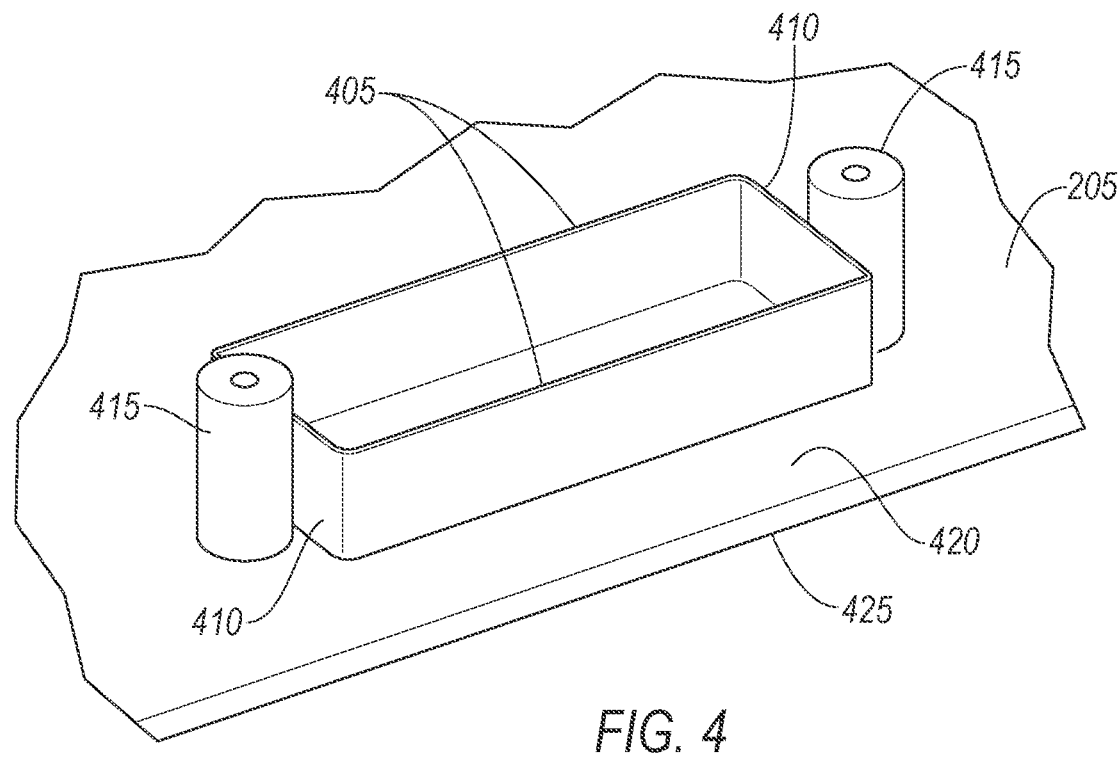
FIG. 4 is a perspective view of a portion of a panel of the vehicle assembly.

With reference to FIG. 4, the housing 110, e.g., the housing lower structure 210, includes the panel 205. The panel 205 may be oriented generally horizontally, e.g., sloped less than 45° from horizontal. The panel 205 may be sloped in order to permit drainage of fluid that enters the chamber 215. The panel 205 may separate the chamber 215 from the body panel 125 of the vehicle 100 to which the housing 110 is attached, e.g., the roof 130. The panel 205 may have a top surface 420 facing away from the body panel 125 and a bottom surface 425 facing toward the body panel 125.

The panel 205 includes the channel 405 and two end walls 410. The channel 405 and the two end walls 410 may extend upward from the top surface 420 of the panel 205. The channel 405 may include two parallel ridges. The channel 405 may extend from one of the end walls 410 to the other of the end walls 410. The channel 405 and the end walls 410 may thereby define a closed loop, which is beneficial for containing the manifold 305 and the valves 310. The channel 405 may be straight, thereby facilitating arrangement of the valves 310 into a simple-to-assemble row. To the same end, the channel 405 may be longer than the end walls 410. As a result of forming a closed loop and the straightness of the channel 405, the channel 405 and the end walls 410 may define a rectangular protrusion from the panel 205.

The channel 405 and the end walls 410 may be integral to the panel 205, i.e., made of a single, uniform piece of material with no seams, joints, fasteners, or adhesives holding the channel 405 and the end walls 410 and the rest of the panel 205 together. The panel 205 may thereby provide a small number of parts and have a small dimensional stackup.

Figure 5:
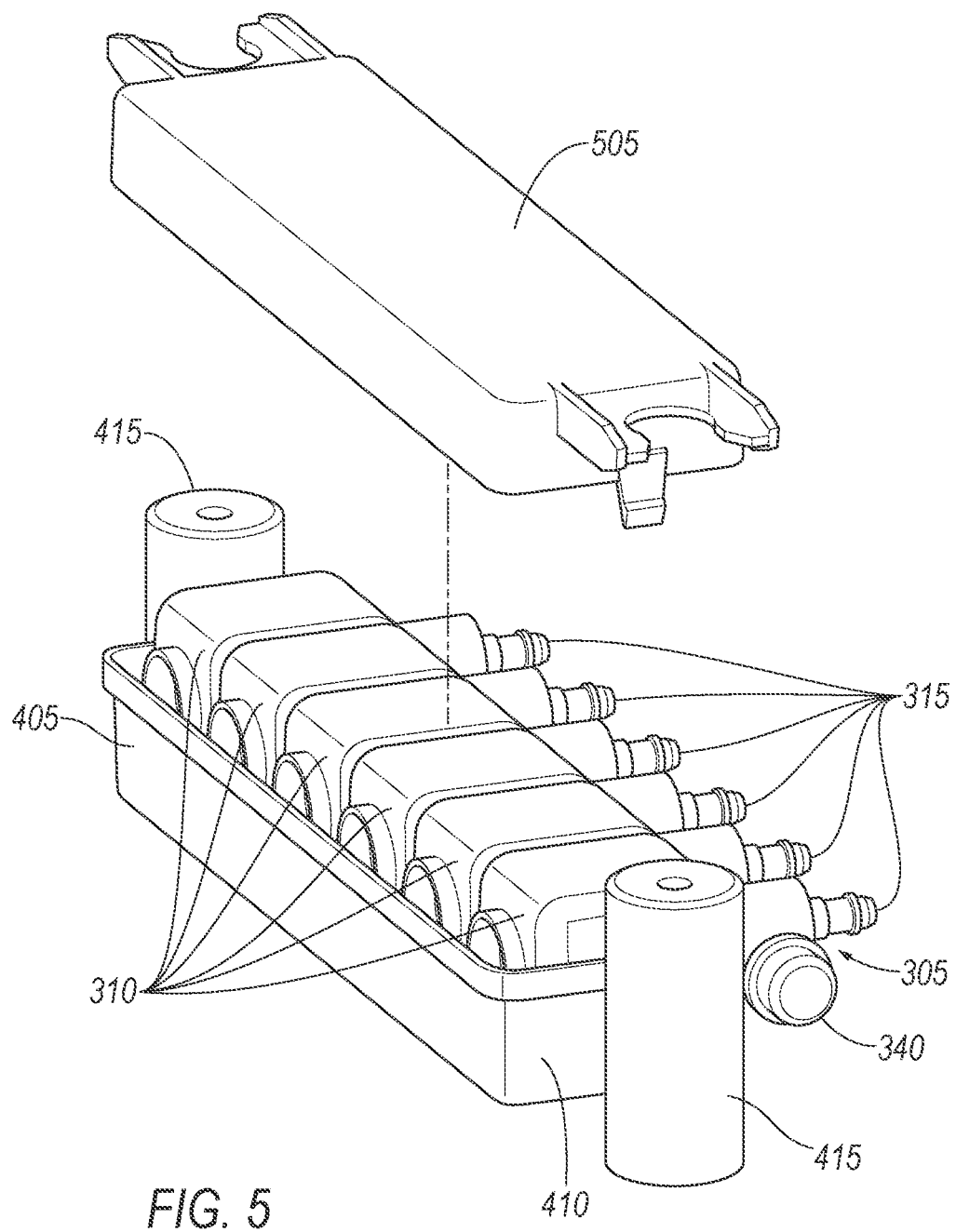
FIG. 5 is a perspective view of a portion of the vehicle assembly.

With reference to FIG. 5, the manifold 305 may be disposed in the chamber 215. The manifold 305 may be disposed in the channel 405. The position of the manifold 305 may thereby be at least partially fixed by the channel 405 and/or the end walls 410. The position of the manifold 305 may be fixed by the channel 405, the end walls 410, and the cover 505. The channel 405 may prevent movement of the manifold 305 in a direction parallel to the top surface 420 of the panel 205 and perpendicular to the channel 405, the end walls 410 may prevent movement of the manifold 305 in a direction parallel to the direction of elongation of the channel 405, and the cover 505 may prevent movement of the manifold 305 in a direction orthogonal to the top surface 420.

The manifold 305 includes the inlet 340, a pipe 345 connecting the inlet 340 to the outlets 315, and the outlets 315. The manifold 305 may include only a single inlet 340. The pipe 345 may extend parallel to a direction defined by the channel 405, i.e., a direction of elongation of the channel 405. The inlet 340 may be parallel to the pipe 345 and aligned coaxially with the pipe 345. The outlets 315 may extend perpendicular to the direction defined by the channel 405, e.g., in a same direction as each other. The relative direction of the outlets 315 to the pipe 345 may permit attachment of the valves 310 in a row on an opposite side of the pipe 345 as the outlets 315. The location of the inlet 340 keeps the inlet 340 out of the way of the outlets 315, the valves 310, and the cover 505.

The valves 310 are attached to the manifold 305. The valves 310 may be positioned such that the valves 310 are operable to selectively block or permit flow from the inlet 340 to the respective outlets 315, e.g., each valve 310 may be operable to permit or block flow from the inlet 340 to a corresponding one of the outlets 315. For example, each valve 310 may be positioned such that the solenoid may actuate to extend the plunger into the outlet 315, i.e., the closed position, and retract the plunger from the outlet 315, i.e., the open position. The valves 310 may be positioned external to the manifold 305, e.g., on an opposite side of the pipe 345 of the manifold 305 from the outlets 315. The valves 310 are positioned in the channel 405. For example, the valves 310 may be arranged in a single row along a length of the channel 405, an arrangement that keeps the valves 310 in place and permits all the valves 310 to be located next to the manifold 305. The channel 405 may prevent movement of the valves 310 in a direction parallel to the top surface 420 of the panel 205 and perpendicular to the channel 405, the adjacent valves 310 may prevent movement of the valves 310 in a direction parallel to the direction of elongation of the channel 405 (along with the end walls 410 for the valves 310 at the ends of the row), and the cover 505 may prevent movement of the valves 310 in a direction orthogonal to the top surface 420.

The valves 310 may be individually removable from the channel 405. In other words, one of the valves 310 may be removed without disturbing the other valves 310. The vehicle assembly 105 may lack fasteners directly attaching the valves 310 to the panel 205, making removal of the valves 310 simple when the cover 505 is detached. Being external to the manifold 305 permits removal of the valves 310 without removal of the manifold 305. The valves 310 may contact each other and be unconnected to each other, making removal easier.

The cover 505 may extend over the manifold 305 and the valves 310. The cover 505 may extend from one of the end walls 410 to the other of the end walls 410. The cover 505 may hold the manifold 305 and the valves 310 in place. In other words, when the cover 505 is in place, the cover 505 blocks of the manifold 305 and the valves 310 from moving out of the channel 405.

The cover 505 is fixed to the panel 205. For example, the cover 505 may be attached to the panel 205 at one or more attachment points 415, e.g., at a maximum of two attachment points 415, e.g., at two attachment points 415. Each attachment point 415 may be, e.g., a fastener, snap, etc. holding the cover 505 to the panel 205. Two attachment points 415 may be a minimal number of attachment points 415 to provide coverage of a single row of the valves 310. The attachment points 415, e.g., the two attachment points 415, may be located outside of the channel 405, e.g., beyond opposite ends of the channel 405, i.e., beyond the end walls 410 along the length of the channel 405. Locating the attachment points 415 outside the channel 405 prevents interference by the attachment points 415 with the valves 310. Locating the attachment points 415 outside the channel 405 beyond the end walls 410 provides strong attachment of the cover 505 with only two attachment points 415. The cover 505 may be removed by a technician to access the manifold 305 and the valves 310.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle assembly for sensor-cleaning, comprising:
a housing including a panel, the panel including a channel integral to the panel;
a manifold disposed in the channel, the manifold including a plurality of outlets;

a plurality of valves attached to the manifold and disposed in the channel, the valves selectively controlling flow to the outlets, the valves contacting each other and unconnected to each other; and a cover extending over the manifold, the cover fixed to the panel, the cover holding the valves in place.

2. The vehicle assembly of claim 1, further comprising a sensor disposed in the housing.

3. The vehicle assembly of claim 2, wherein the housing includes a housing lower structure, the housing lower structure includes the panel, and the housing lower structure supports the sensor.

4. The vehicle assembly of claim 3, wherein the housing lower structure is integral with itself.

5. The vehicle assembly of claim 3, wherein the housing includes a housing upper structure fixed to the housing lower structure, the housing upper structure and the housing lower structure define a chamber therebetween, the sensor is disposed in the chamber, and the manifold is disposed in the chamber.

6. The vehicle assembly of claim 2, further comprising a nozzle aimed at the sensor, wherein the nozzle is fluidly connected to one of the outlets.

7. The vehicle assembly of claim 1, wherein the panel includes two end walls integral to the panel, and the channel extends from one of the end walls to the other of the end walls.

8. The vehicle assembly of claim 7, wherein the channel and the end walls define a closed loop.

9. The vehicle assembly of claim 8, wherein the channel and the end walls define a rectangular protrusion from the panel.

10. The vehicle assembly of claim 1, wherein the valves are individually removable from the channel.

11. The vehicle assembly of claim 1, wherein the vehicle assembly lacks fasteners directly attaching the valves to the panel.

12. The vehicle assembly of claim 1, wherein the manifold includes a single inlet, and the valves selectively control flow from the inlet to the respective outlets.

13. The vehicle assembly of claim 12, further comprising a pump arranged to supply fluid to the inlet.

14. The vehicle assembly of claim 1, wherein the cover is fixed to the panel at an attachment point outside the channel.

15. The vehicle assembly of claim 1, wherein the cover is fixed to the panel at a maximum of two attachment points.

16. The vehicle assembly of claim 15, wherein the maximum of two attachment points include two attachment points, and the two attachment points are located outside the channel.

17. The vehicle assembly of claim 16, wherein the attachment points are located beyond respective opposite ends of the channel and are separate from the ends of the channel.

18. The vehicle assembly of claim 1, wherein the valves are arranged in a single row along a length of the channel.

19. The vehicle assembly of claim 1, wherein the channel is straight, and the outlets extend perpendicular to a direction defined by the channel.

20. The vehicle assembly of claim 1, wherein the valves are solenoid valves.

* * * * *